(12) United States Patent
Teichmann et al.

(10) Patent No.: US 8,408,566 B2
(45) Date of Patent: Apr. 2, 2013

(54) SUBFRAME

(75) Inventors: Heiko Teichmann, Weil im Schönbuch (DE); Dennis Tegelkamp, Ludwigsburg (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 44 days.

(21) Appl. No.: 12/910,947

(22) Filed: Oct. 25, 2010

(65) Prior Publication Data

US 2011/0095573 A1     Apr. 28, 2011

(30) Foreign Application Priority Data

Oct. 23, 2009    (DE) .......................... 10 2009 050 495

(51) Int. Cl.
 *B62D 21/15* (2006.01)
(52) U.S. Cl. ................. 280/124.109; 180/274; 180/312; 280/784; 296/187.08; 296/193.07; 296/204
(58) Field of Classification Search .................. 180/274, 180/311, 312; 220/562; 248/503; 280/124.109, 280/784, 797, 798, 800, 834; 296/187.08, 296/193.07, 204
See application file for complete search history.

(56) References Cited

U.S. PATENT DOCUMENTS

| | | | |
|---|---|---|---|
| 1,638,292 A | | 10/1923 | Cross |
| 2,613,986 A | * | 10/1952 | Heyl, Jr. ........................ 296/204 |
| 2,972,498 A | * | 2/1961 | Kelley ........................... 296/204 |
| 3,761,108 A | * | 9/1973 | Hemmings .................... 280/788 |
| 4,723,810 A | * | 2/1988 | Kanemaru et al. ........ 296/203.02 |
| 4,899,843 A | * | 2/1990 | Takano et al. ................. 180/312 |
| 5,054,575 A | * | 10/1991 | Collins .......................... 180/354 |
| 5,085,484 A | * | 2/1992 | Mori ............................. 296/204 |
| 5,542,707 A | * | 8/1996 | Kamei et al. .................. 280/834 |
| 5,556,133 A | * | 9/1996 | Oku et al. ..................... 280/781 |
| 5,562,308 A | * | 10/1996 | Kamei et al. .................. 280/788 |
| 6,003,900 A | * | 12/1999 | Hasegawa et al. ............ 280/834 |
| 6,109,654 A | * | 8/2000 | Yamamoto et al. ........... 280/784 |
| 6,206,460 B1 | * | 3/2001 | Seeliger et al. ............... 296/204 |
| 6,270,153 B1 | * | 8/2001 | Toyao et al. ................... 296/204 |
| 6,550,561 B2 | * | 4/2003 | Dau et al. ...................... 180/299 |
| 6,619,730 B2 | | 9/2003 | Pörner |
| 6,767,020 B2 | * | 7/2004 | Yamamoto et al. .... 280/124.109 |

(Continued)

FOREIGN PATENT DOCUMENTS

| | | |
|---|---|---|
| DE | 4443897 C1 | 2/1996 |
| DE | 19703504 A1 * | 10/1997 |

(Continued)

*Primary Examiner* — Paul N Dickson
*Assistant Examiner* — Laura Freedman
(74) *Attorney, Agent, or Firm* — Gerald E. Hespos; Michael J. Porco; Matthew T. Hespos

(57) ABSTRACT

A subframe for a front axle of a motor vehicle is arranged on the floor side of the vehicle structure and is connected to a front axle transverse beam and to the vehicle body. The subframe substantially contains two longitudinal beams which are arranged in a divergent fashion in relation to one another and which are connected at the rear end—as viewed in relation to the direction of travel—to a plate-shaped stiffening element. The latter is held together with the longitudinal beams on a central tunnel of the vehicle structure by fastening devices, with it being possible for the free front ends of the longitudinal beams to be fastened to the front axle transverse beam by further fastening devices.

8 Claims, 3 Drawing Sheets

U.S. PATENT DOCUMENTS

| | | | |
|---|---|---|---|
| 6,997,276 B2 * | 2/2006 | Yoshida et al. | 180/232 |
| 7,229,099 B2 * | 6/2007 | Reim et al. | 280/784 |
| 7,393,016 B2 * | 7/2008 | Mitsui et al. | 280/784 |
| 7,469,957 B1 * | 12/2008 | Boettcher | 296/193.07 |
| 7,516,968 B2 * | 4/2009 | Cortez et al. | 280/124.116 |
| 7,614,684 B2 * | 11/2009 | Yasuhara et al. | 296/187.09 |
| 7,641,236 B2 * | 1/2010 | Yasuhara et al. | 280/781 |
| 7,810,878 B2 * | 10/2010 | Nakamura et al. | 296/203.02 |
| 7,891,728 B2 * | 2/2011 | Westing et al. | 296/204 |
| 2004/0108677 A1 * | 6/2004 | Sekiguchi | 280/124.109 |
| 2012/0212009 A1 * | 8/2012 | Ishizono et al. | 296/193.07 |
| 2012/0242113 A1 * | 9/2012 | Yasuhara et al. | 296/193.07 |
| 2012/0256446 A1 * | 10/2012 | Yasuhara et al. | 296/193.07 |

FOREIGN PATENT DOCUMENTS

| | | |
|---|---|---|
| DE | 199 59 607 A1 | 9/2003 |
| DE | 102005044062 A1 | 5/2007 |
| DE | 102006013548 A1 | 10/2007 |
| JP | 2006051942 A * | 2/2006 |

* cited by examiner

SUBFRAME

CROSS-REFERENCE TO RELATED APPLICATION

This application claims the priority, under 35 U.S.C. §119, of German application DE10 2009 050 495.8, filed Oct. 23, 2009; the prior application is herewith incorporated by reference in its entirety.

BACKGROUND OF THE INVENTION

Field of the Invention

The invention relates to a subframe for a front axle of a motor vehicle, which subframe is arranged on a floor side of the vehicle structure and is connected to a front axle transverse beam and to the vehicle body.

Published, non-prosecuted German patent application DE 199 59 607 A1, corresponding to U.S. Pat. No. 6,619,730, discloses a vehicle body having a floor-side strut arrangement which is composed of a frame connected to a chassis transverse beam, with a further connection of the frame to the vehicle body being provided.

SUMMARY OF THE INVENTION

It is an object of the invention to provide a subframe that ensures a stiffening of the vehicle underbody and also improves crash behavior in the event of a frontal crash of the vehicle.

With the foregoing and other objects in view there is provided, in accordance with the invention a subframe for a front axle of a motor vehicle, the subframe disposed on a floor side of a vehicle structure and connected to a front axle transverse beam and to a vehicle body. The subframe contains a plate-shaped stiffening element having rear fastening devices for fastening to a central tunnel of the vehicle body and longitudinal beams disposed in a divergent fashion in relation to one another and have rear ends, as viewed in relation to a direction of travel, connected to the plate-shaped stiffening element. The longitudinal beams have free front ends with further fastening devices for mounting to the front axle transverse beam.

The main advantages obtained with the invention consist substantially in that, by provision of the subframe, forces introduced in the event of a frontal crash are absorbed and can be transmitted into the floor assembly, and furthermore an additional stiffness function can be obtained in the region of the front end of the central tunnel, and therefore in particular in a cabriolet vehicle increased body stiffness can be obtained as a result of a stiffening of the vehicle underbody. This is advantageously achieved according to the invention in that the subframe contains two longitudinal beams which are arranged in a divergent fashion in relation to one another and which are connected at the rear end—as viewed in relation to the direction of travel—to a plate-shaped stiffening element. The latter is fastened to a central tunnel of the vehicle body by fastening devices, with the free front ends of the longitudinal beams being fastened to the front axle transverse beam by further fastening devices.

It is provided according to the invention in particular that the front axle transverse beam contains two beam arms which run in the vehicle longitudinal direction counter to the direction of travel and which are connected to the vehicle floor of the vehicle body, and the free front ends of the longitudinal beams of the subframe are held on the inner side of the beam arms by the fastening devices. The longitudinal beams extend from the fastening devices at an angle obliquely inward toward the vehicle longitudinal central axis and are fixed to both sides of the central tunnel by the further fastening devices. As a result of the divergent configuration of the longitudinal beams of the subframe, that is to say the spreading in the direction of travel, a crash function is obtained in the event of a frontal crash in that the longitudinal beams fastened to the central tunnel can provide an additional absorption of force.

For this purpose, the two longitudinal beams form in each case a two-shell closed hollow beam which contains an upper shell which is of U-shaped profile in cross section and which is closed off by a plate-shaped lower shell which extends up to the stiffening element. It is provided according to the invention in particular that, in the region of the rear ends of the longitudinal beams, the plate-shaped lower shell contains between the ends a transversely running connecting plate which has a profiled connecting web which is cut out in a U-shape and which adjoins the stiffening element. By this configuration, the two longitudinal beams are connected to one another adjacent to the plate-shaped stiffening element additionally by the plate-shaped lower shell to form a structural unit.

For further stabilization of the subframe, the transversely running connecting plate is arranged below the plate-shaped stiffening element, as a result of which, in the region of the rear fastening devices of the longitudinal beams on the central tunnel of the vehicle body, a three-shell member is formed which is composed of at least the connecting plate, the stiffening element and the upper shell. In this way, that region of the subframe which is fastened to the central tunnel and therefore to the floor assembly of the vehicle is of optimally stable design for the absorption of forces, which is advantageous for example in the event of a frontal crash.

To fasten the plate-shaped stiffening element, the latter has, on each side, in each case two projecting flange surfaces which are arranged one behind the other and which face toward laterally offset webs of the central tunnel and are connected thereto by the fastening devices. A depression which is U-shaped in cross section is preferably provided between the flange surfaces of each side, which depression has, in the center, a longitudinally running bead. The plate-shaped lower shell, like the upper shell, is composed preferably of a steel material and is formed with a profiled connecting web which has a transversely running indentation. The rear plate-shaped stiffening element composed of steel is also configured, for stiffening, in a profiled fashion with beads and the U-shaped depression. The components may also be composed of a lightweight metal material.

For the fastening of tank clamping straps, the longitudinal beams of the subframe each have, on the upper side, brackets which can be connected to the tank clamping straps and which are held in a suspended fashion at the front side on the front axle transverse beam.

Other features which are considered as characteristic for the invention are set forth in the appended claims.

Although the invention is illustrated and described herein as embodied in a subframe, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages

DETAILED DESCRIPTION OF THE INVENTION

Figure 1:
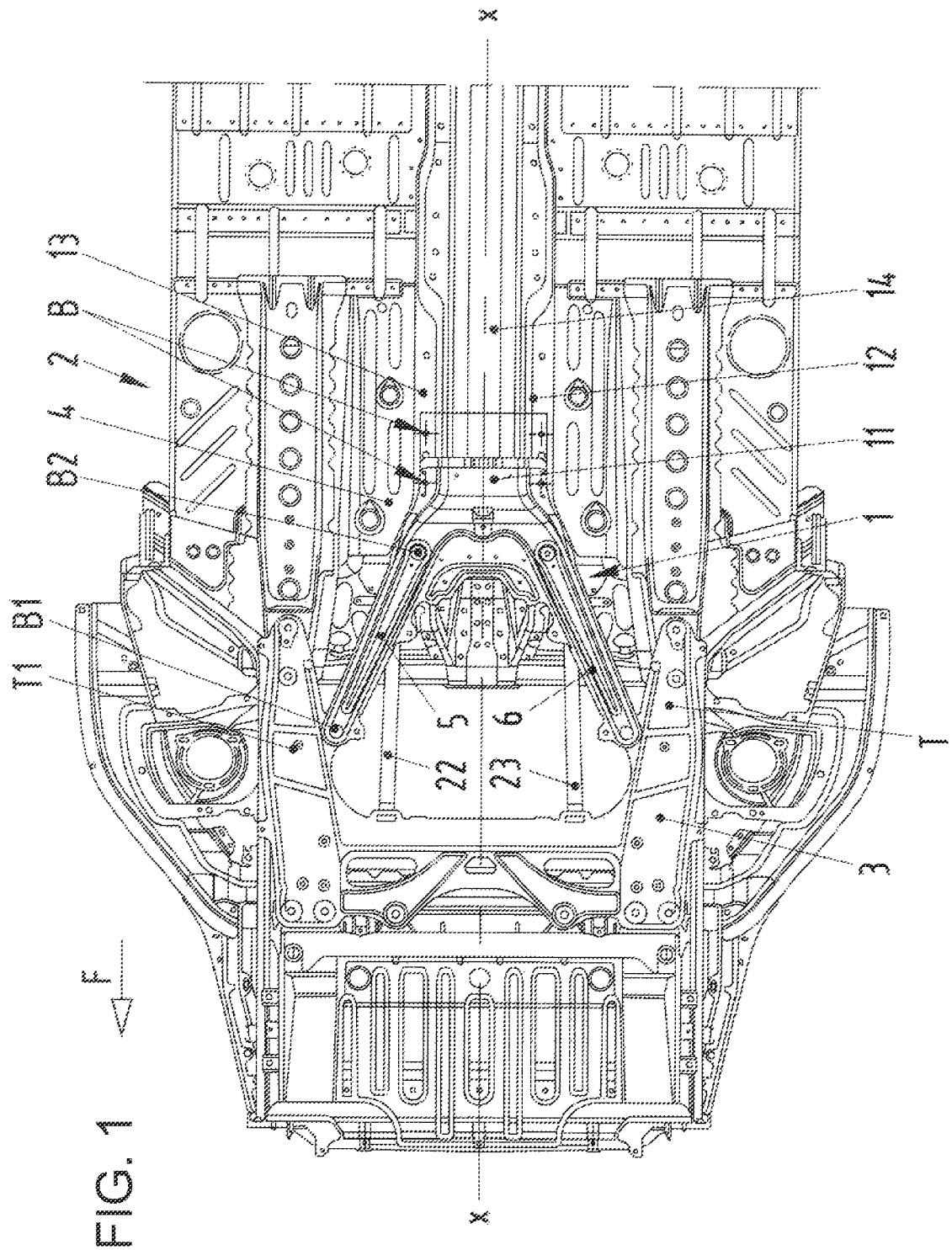
FIG. 1 is a diagrammatic, bottom plan view of a subframe of a motor vehicle in an installed state according to the invention.
Figure 2:
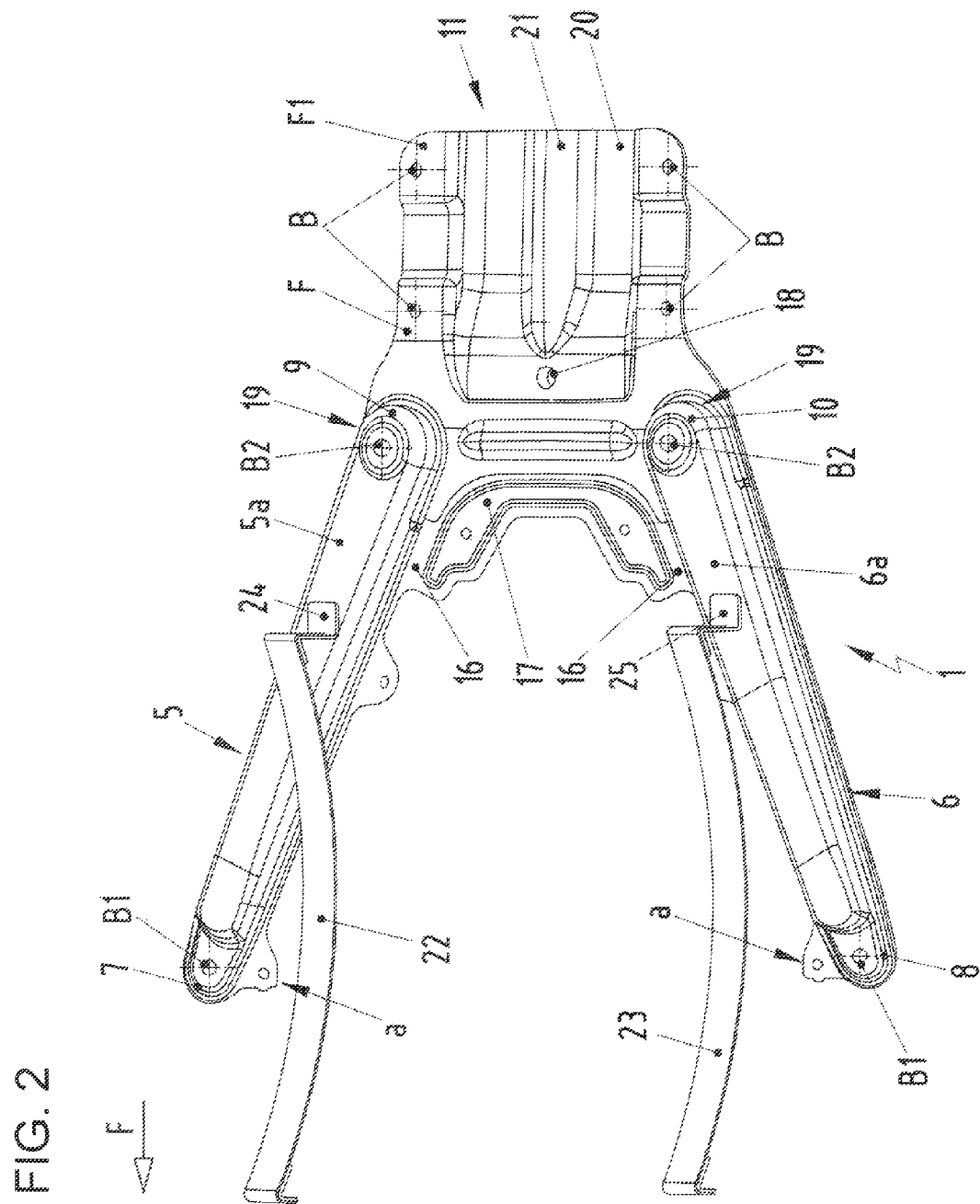
FIG. 2 is a diagrammatic, perspective view of the subframe with longitudinal beams arranged in a divergent fashion and having a connected rear plate-shaped stiffening element and underlying plate-shaped lower shell together with tank clamping straps.
Figure 3:
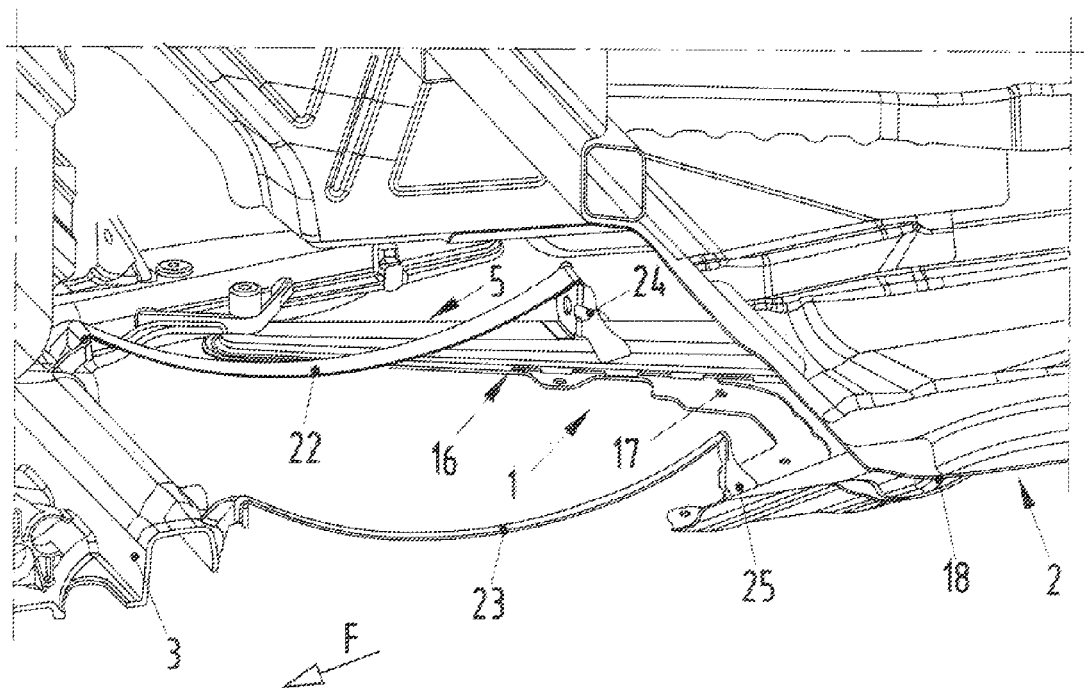
FIG. 3 is a diagrammatic, perspective view of the installed subframe as viewed from the side of the vehicle.

Referring now to the figures of the drawing in detail and first, particularly, to FIG. 1 thereof, there is shown a subframe 1 for a front axle of a motor vehicle which is arranged on a floor side of a vehicle structure 2 and is connected at one side to a front axle transverse beam 3 and at the other side to a floor assembly 4 of the vehicle structure 2.

The subframe 1 contains two longitudinal beams 5, 6 which are arranged in a divergent fashion in relation to one another and whose front free ends 7, 8 have a greater spacing a to one another than remote rear ends 9, 10—as viewed in relation to a direction of travel F.

The remote rear ends 9, 10 of the longitudinal beams 5, 6 are connected to a plate-shaped stiffening element 11. The stiffening element 11 is connected by fastening devices B to lateral webs 12, 13 of a central tunnel 14 of the vehicle structure 2, with the rear ends 9, 10 of the longitudinal beams 5, 6 being connected by fastening devices B2 to the floor assembly 4 and the central tunnel 14. Furthermore, the front free ends 7, 8 are connected by further fastening devices B1 to the front axle transverse beam 3. The fastening devices are illustrated symbolically by a cross.

The two longitudinal beams 5, 6 are composed in each case of a two-shell closed hollow beam which contains an upper shell 5a, 6a which is of U-shaped profile in cross section and which is closed off by a plate-shaped lower shell 16 in the manner of a cover. The lower shell 16 extends preferably into the region of the rear ends 9, 10 of the longitudinal beams 5, 6 and has a transversely running connecting plate 18 which has a connecting web 17 which is cut out in a U-shape and which adjoins the stiffening element 11. The transversely running connecting plate 18 extends from the connecting web 17 preferably as far as below the stiffening element 11, in such a way that a three-shell member assembly is formed at a fastening point 19 by the fastening device B2. The member assembly is composed of the upper shell 5a, 6a, the lower shell 16 and the stiffening element 11. The components are all arranged one above the other, and are fixed by the fastening device B2 to the central tunnel 14 and to the vehicle floor, at the fastening point 19.

For the fastening of the subframe 1 to the central tunnel 14 by the stiffening element 11, two flange surfaces F and F1 arranged one behind the other are provided on each outer side of the stiffening element 11, in which flange surfaces F and F1 in each case one fastening device B to the webs 12, 13 of the central tunnel 14 can be located.

A depression 20 which is U-shaped in cross section is provided between the flange surfaces F, F1 of each side, which depression 20 has a longitudinally running bead 21.

For the fastening of a fuel tank, tank clamping straps 22, 23 are provided which are held on the longitudinal beams 5, 6 via brackets 24, 25. The remote front ends of the tank clamping straps 22, 23 are held on the front axle transverse beam 3. The front free ends of the tank clamping straps 22, 23 are angled and, during the mounting of the subframe 1, are suspended on the already-assembled front axle transverse beam 3, and the subframe 1 is subsequently pivoted upward in the direction of the vehicle floor, after which the subframe 1 is fixedly screwed to the front axle transverse beam 3 and to the central tunnel 14. The front axle transverse beam 3 contains beam arms t, t1 which extend counter to the direction of travel f from a transverse bridge and which are connected to the floor structure of the vehicle. The front free ends 7 and 8 of the longitudinal beams 5, 6 are held and supported on the inner side of the support arms t and t1 of the front axle transverse beam 3 by the fastening devices B1. From the fastening devices B1, the longitudinal beams 5, 6 extend at an angle obliquely inward toward the vehicle longitudinal central axis x-x. Part of the lower shell 16 near the front free ends 7, 8 of the longitudinal beams 5, 6 preferably have fasting apertures "a" for mounting another structure, such as a panel (not shown) below the fuel tank.

We claim:

1. A subframe for a front axle of a motor vehicle, the subframe disposed on a floor side of a vehicle structure and connected to a front axle transverse beam and to a vehicle body, the subframe comprising: stiffening element having rear fastening devices for fastening to a central tunnel of the vehicle body; and first and second longitudinal beams having rear ends, as viewed in relation to a direction of travel, connected to said stiffening element and diverging from one another at positions forward of the stiffening element, said longitudinal beams having free front ends with further fastening devices for mounting to the front axle transverse beam, each of the longitudinal beams forming a two-shell closed hollow beam having an upper shell that is of U-shaped profile in cross section and a lower shell that extends to said stiffening element and closes off said upper shell, the lower shell having a transversely running connecting plate extending between the longitudinal beams in a region of the rear ends of the longitudinal beams, the connecting plate having a profiled connecting web defining in a U-shape and adjoining the stiffening element.

2. The subframe according to claim 1, wherein said transversely running connecting plate extends below said stiffening element and, in a region of said rear fastening devices of said longitudinal beams on the central tunnel of the vehicle body, forms a three-shell member composed of at least said transversely running connecting plate, said stiffening element and said upper shell.

3. The subframe according to claim 1, wherein said stiffening element has first and second lateral sides, front and rear flanges arranged one behind another on each of the first and second lateral sides of the stiffening element, the flanges facing toward laterally offset webs of the central tunnel and being connected thereto by said rear fastening devices.

4. The subframe according to claim 1, wherein the front axle transverse beam contains two beam arms that run in a vehicle longitudinal direction counter to the direction of travel and that are connected to a vehicle floor of the vehicle body, said free front ends of said longitudinal beams are held on an inner side of the beam arms by said further fastening devices, and said longitudinal beams extend from said further fastening devices at an angle obliquely inward toward a vehicle longitudinal central axis and can be fixed to both sides of the central tunnel by said rear fastening devices.

5. A subframe for a front axle of a motor vehicle, the subframe disposed on a floor side of a vehicle structure and connected to a front axle transverse beam and to a vehicle body, the subframe comprising: a stiffening element having rear fastening devices for fastening to a central tunnel of the vehicle body; and first and second longitudinal beams having rear ends, as viewed in relation to a direction of travel, connected to said stiffening element and diverging from one another at positions forward of the stiffening element, said longitudinal beams having free front ends with further fastening devices for mounting to the front axle transverse beam, the stiffening element having first and second lateral sides, front and rear flanges arranged one behind another on each of the first and second lateral sides of the stiffening element, the flanges facing toward laterally offset webs of the central tunnel and being connected thereto by said rear fastening devices, said stiffening element having a depression formed therein which is U-shaped in cross section and is disposed between said flanges on the first side and the flanges on the second side, said depression has, in a center, a longitudinally running bead.

6. The subframe according to claim 5, wherein each of the longitudinal beams forms a two-shell closed hollow beam having an upper shell which is of U-shaped profile in cross section and a lower shell that extends to said stiffening element and closes off said upper shell.

7. The subframe according to claim 6, wherein in a region of said rear ends of said longitudinal beams, said lower shell contains between said rear ends a transversely running connecting plate which has a profiled connecting web which is cut out in a U-shape and which adjoins said stiffening element.

8. A subframe for a front axle of a motor vehicle the subframe disposed on a floor side of a vehicle structure and connected to a front axle transverse beam and to a vehicle body, the subframe comprising: a stiffening element having rear fastening devices for fastening to a central tunnel of the vehicle body; and first and second longitudinal beams having rear ends, as viewed in relation to a direction of travel, connected to said stiffening element and diverging from one another at positions forward of the stiffening element, said longitudinal beams having free front ends with further fastening devices for mounting to the front axle transverse beam, first and second brackets secured respectively to upper sides of the respective first and second longitudinal beams, the first and second brackets being configured to be connected to rear ends of respective first and second tank clamping straps, while front ends of the tank clamping straps are suspended from the front axle transverse beam.

* * * * *